United States Patent
Li

(10) Patent No.: US 12,088,530 B2
(45) Date of Patent: Sep. 10, 2024

(54) UPLINK TRANSMISSION FEEDBACK AND RETRANSMISSION METHODS AND APPARATUSES, TERMINAL, AND STORAGE MEDIUM

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 373 days.

(21) Appl. No.: 17/594,304

(22) PCT Filed: Apr. 16, 2019

(86) PCT No.: PCT/CN2019/082924
§ 371 (c)(1),
(2) Date: Oct. 9, 2021

(87) PCT Pub. No.: WO2020/210992
PCT Pub. Date: Oct. 22, 2020

(65) Prior Publication Data
US 2022/0173873 A1     Jun. 2, 2022

(51) Int. Cl.
*H04L 5/00* (2006.01)
*H04L 1/1607* (2023.01)

(52) U.S. Cl.
CPC .......... *H04L 5/0055* (2013.01); *H04L 1/1607* (2013.01)

(58) Field of Classification Search
CPC ... H04L 5/0055; H04L 1/1607; H04L 1/1864; H04L 1/1861; H04L 1/0041; H04L 1/0061; H04L 1/0072; H04L 1/0018
See application file for complete search history.

(56) References Cited

U.S. PATENT DOCUMENTS

| | | | |
|---|---|---|---|
| 2017/0163568 A1* | 6/2017 | Huang | H04L 49/201 |
| 2017/0207895 A1 | 7/2017 | Yang et al. | |
| 2017/0338911 A1 | 11/2017 | You et al. | |
| 2018/0102881 A1* | 4/2018 | Cheng | H04W 72/0446 |
| 2018/0219665 A1* | 8/2018 | Yu | H04L 1/1812 |
| 2018/0368117 A1 | 12/2018 | Ying et al. | |
| 2019/0165899 A1 | 5/2019 | Gao et al. | |

(Continued)

FOREIGN PATENT DOCUMENTS

| | | |
|---|---|---|
| CN | 102164029 B | 4/2014 |
| CN | 102546134 | 7/2015 |

(Continued)

OTHER PUBLICATIONS

International Search Report in the international application No. PCT/CN2019/082924, mailed on Dec. 12, 2019.

(Continued)

*Primary Examiner* — Ayaz R Sheikh
*Assistant Examiner* — Mang Boi Thawng
(74) *Attorney, Agent, or Firm* — Syncoda LLC; Feng Ma

(57) ABSTRACT

An uplink transmission retransmission method includes: receiving uplink data sent by a terminal on a first resource of a PUSCH; generating feedback information of the uplink data, the feedback information comprising an ACK or NACK; and sending the feedback information to the terminal using a first PDCCH format on a second resource of a PDCCH.

18 Claims, 6 Drawing Sheets

(56) References Cited

U.S. PATENT DOCUMENTS

| | | | |
|---|---|---|---|
| 2019/0246287 A1 | 8/2019 | Liu | |
| 2020/0221501 A1* | 7/2020 | Han | H04W 72/21 |
| 2020/0236587 A1* | 7/2020 | Kim | H04L 1/1614 |
| 2020/0304239 A1* | 9/2020 | Yang | H04L 1/1854 |
| 2020/0374086 A1* | 11/2020 | Tang | H04L 5/0055 |
| 2021/0006314 A1* | 1/2021 | Takeda | H04W 72/23 |

FOREIGN PATENT DOCUMENTS

| | | |
|---|---|---|
| CN | 103973413 B | 4/2017 |
| CN | 106998245 A | 8/2017 |
| CN | 107295664 A | 10/2017 |
| CN | 107528676 A | 12/2017 |
| CN | 108023706 A | 5/2018 |
| CN | 108702259 A | 10/2018 |
| EP | 3451567 A1 | 3/2019 |
| EP | 3451567 A4 | 5/2019 |
| JP | 5878406 B2 | 3/2016 |
| WO | 2018018620 A1 | 2/2018 |

OTHER PUBLICATIONS

English translation of the Written Opinion of the International Search Authority in the international application No. PCT/CN2019/082924, mailed on Dec. 12, 2019.

Second Office Action of the Chinese application No. 201980000682.7, issued on Oct. 22, 2020.

Lenovo et al: "Design of uplink HARQ-ACK feedback for efeMTC", 3GPP Draft; R1-1707774, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017 May 14, 2017 (May 14, 2017), XP051272977.

Qualcomm Incorporated: "Use of control region for eMTC UEs", 3GPP Draft; R1-1902373, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019 Feb. 16, 2019 (Feb. 16, 2019), XP051600069.

Qualcomm Incorporated: "Use of control region for eMTC UEs", 3GPP Draft; R1-1813045, 3rd Generation Partnership Project (3GPP), Mobile Competence Centre; 650, Route Des Lucioles; F-06921 Sophia-Antipolis Cedex; France, vol. RAN WG1, No. Spokane, USA; Nov. 12, 2018-Nov. 16, 2018 Nov. 11, 2018 (Nov. 11, 2018), XP05155502.

Ericsson: "Introduction of enhancements for eMTC excluding EDT", 3GPP Draft; 36300_CR1134R2_(REL-15) R2-1809253—Introduction of Enhancements for EMTC Excluding EDT-TS 36300, 3rd Generation Partnership Project (3GPP), Mobile Competence Centre; 650, Route Des Lu, vol. RAN WG2, No. Busan, Republic of Korea; May 21, 2018-May 25, 2018 Jun. 7, 2018 (Jun. 7, 2018), XP051503720.

Supplementary European Search Report in the European application No. 19925358.4, mailed on Mar. 14, 2022.

Hearing Notice of the Indian application No. 202147051455, issued on Feb. 9, 2024. 3 pages with English translation.

Hearing Adjournment Notice of the Indian application No. 202147051455, issued on Mar. 11, 2024. 3 pages with English translation.

* cited by examiner

UPLINK TRANSMISSION FEEDBACK AND RETRANSMISSION METHODS AND APPARATUSES, TERMINAL, AND STORAGE MEDIUM

CROSS-REFERENCE TO RELATED APPLICATION

This application is a U.S. national stage of International Application No. PCT/CN2019/082924 filed on Apr. 16, 2019, the disclosure of which is hereby incorporated by reference in its entirety.

TECHNICAL FIELD

The disclosure relates to the field of communications, and more particularly, to an uplink transmission feedback and retransmission methods and apparatuses, a terminal and a storage medium.

BACKGROUND

Enhanced Ultra Reliable Low Latency Communication (eURLLC) puts forward higher requirements for transmission reliability and transmission latency. An end-to-end latency is even required to reach 0.5 ms.

In the present protocol version, for the retransmission of a Physical Uplink Shared Channel (PUSCH), a base station directly retransmits uplink data by scheduling a terminal.

An eURLLC service has a high requirement on a transmission latency, and the end-to-end latency is even required to reach 0.5 ms. The above retransmission method that the base station schedules the terminal cannot meet the latency requirement.

SUMMARY

Embodiments of the disclosure provide an uplink transmission feedback and retransmission methods and apparatuses, a terminal and a storage medium, which may shorten an uplink data retransmission latency and improve an uplink data retransmission efficiency. The technical solutions are as follows.

According to an aspect of the disclosure, an uplink transmission feedback method is provided, which includes: receiving uplink data sent by a terminal on a first resource of a Physical Uplink Shared Channel (PUSCH); generating feedback information of the uplink data, the feedback information comprising Acknowledgement feedback (ACK) or Negative Acknowledgement feedback (NACK); and sending the feedback information to the terminal using a first Physical Downlink Control Channel (PDCCH) format on a second resource of a PDCCH.

In a possible implementation mode, the first PDCCH format may occupy X symbols on the PDCCH, here X may be any value or a specified value in 1, 2 and 3.

In a possible implementation mode, a number of symbols between a first symbol of the second resource and a last symbol of the first resource may not be greater than K, here K may be any value or a specified value in 0, 1, 2, and 3.

In a possible implementation mode, the first PDCCH format may be PDCCH format 2_4.

In a possible implementation mode, Cyclic Redundancy Check (CRC) of the first PDCCH format may be scrambled using an ACK Radio-Network Temporary Identifier (ACK-RNTI) corresponding to the terminal. The ACK-RNTI may be an identifier shared by the terminal and other terminals.

In a possible implementation mode, the method may further include: the ACK-RNTI is configured to the terminal.

In a possible implementation mode, the method may further include: a sequence position of the feedback information in a feedback information sequence group in the first PDCCH format is determined.

In a possible implementation mode, before the feedback information is sent to the terminal using the first PDCCH format on the second resource of the PDCCH, the method may further include: the sequence position is configured to the terminal using a second PDCCH format on the PDCCH, the second PDCCH format being PDCCH format 0_0 or PDCCH format 0_1; or, the sequence position is semi-statically configured to the terminal using Radio Resource Control (RRC) signaling.

According to another aspect of the disclosure, an uplink transmission retransmission method is provided, which includes: sending uplink data to a base station on a first resource of a Physical Uplink Shared Channel (PUSCH); receiving feedback information sent by the base station using a first Physical Downlink Control Channel (PDCCH) format on a second resource of a PDCCH, the feedback information comprising Acknowledgement feedback (ACK) or Negative Acknowledgement feedback (NACK); and retransmitting the uplink data in response to the feedback information being the NACK.

In a possible implementation mode, the first PDCCH format may occupy X symbols on the PDCCH, here X may be any value or a specified value in 1, 2 and 3.

In a possible implementation mode, the operation that the feedback information sent by the base station using the first PDCCH format is received on the second resource of the PDCCH may include: blink detection is performed to the PDCCH within K symbols following a last symbol of the first resource; in response to the first PDCCH format being detected on the PDCCH, the feedback information sent using the first PDCCH format is received.

In a possible implementation mode, the operation that the feedback information sent using the first PDCCH format is received may include: CRC is performed to the first PDCCH format using an ACK-RNTI; the ACK-RNTI is an identifier shared by a present terminal and other terminals.

In a possible implementation mode, the method may further include: the ACK-RNTI configured by the base station is received.

In a possible implementation mode, the method may further include: the uplink data is retransmitted according to a third resource scheduled using a second PDCCH format in response to the second PDCCH format being detected on the PDCCH; the second PDCCH format is PDCCH format 0_0 or PDCCH format 0_1.

In a possible implementation mode, the method may further include: a sequence position of the feedback information in a feedback information sequence group in the first PDCCH format is determined.

In a possible implementation mode, before the feedback information is sent to the terminal using the first PDCCH format on the second resource of the PDCCH, the method may further include: a second PDCCH format sent by the base station and the sequence position configured in the second PDCCH format are received, the second PDCCH format being PDCCH format 0_0 or PDCCH format 0_1; or, RRC signaling sent by the base station is received, the RRC signaling being used for semi-statically configuring the sequence position.

According to another aspect of the disclosure, an uplink transmission feedback apparatus is provided, which includes: a receiving module, a generating module and a sending module. The receiving module is configured to receive uplink data sent by a terminal on a first resource of a PUSCH. The generating module is configured to generate feedback information of the uplink data, the feedback information including ACK or NACK. The sending module is configured to send the feedback information to the terminal using a first PDCCH format on a second resource of a PDCCH.

In a possible implementation mode, the first PDCCH format may occupy X symbols on the PDCCH, here X may be any value or a specified value in 1, 2 and 3.

In a possible implementation mode, a number of symbols between a first symbol of the second resource and a last symbol of the first resource may not be greater than K, here K may be any value or a specified value in 0, 1, 2, and 3.

In a possible implementation mode, the first PDCCH format may be PDCCH format 2_4.

In a possible implementation mode, CRC of the first PDCCH format may be scrambled using an ACK-RNTI corresponding to the terminal. The ACK-RNTI may be an identifier shared by the terminal and other terminals.

In a possible implementation mode, the sending module may further be configured to configure the ACK-RNTI to the terminal.

In a possible implementation mode, the apparatus may further include a determining module. The determining module is configured to determine a sequence position of the feedback information in a feedback information sequence group in the first PDCCH format.

In a possible implementation mode, the sending module may further be configured to configure the sequence position to the terminal using a second PDCCH format on the PDCCH, the second PDCCH format being PDCCH format 0_0 or PDCCH format 0_1, or semi-statically configure the sequence position to the terminal using RRC signaling.

According to another aspect of the disclosure, an uplink transmission retransmission apparatus is provided, which includes: a sending module, a receiving module and a processing module. The sending module is configured to send uplink data to a base station on a first resource of a PUSCH. The receiving module is configured to receive feedback information sent by the base station using a first PDCCH format on a second resource of a PDCCH, the feedback information including ACK or NACK. The processing module is configured to retransmit the uplink data in response to the feedback information being the NACK.

In a possible implementation mode, the first PDCCH format may occupy X symbols on the PDCCH, here X may be any value or a specified value in 1, 2 and 3.

In a possible implementation mode, the processing module may be configured to perform blink detection to the PDCCH within K symbols following a last symbol of the first resource. The receiving module may be configured to receive the feedback information sent using the first PDCCH format in response to the first PDCCH format being detected on the PDCCH.

In a possible implementation mode, the processing module may be configured to perform CRC to the first PDCCH format using an ACK-RNTI. The ACK-RNTI may be an identifier shared by a present terminal and other terminals.

In a possible implementation mode, the receiving module may be configured to receive the ACK-RNTI configured by the base station.

In a possible implementation mode, the processing module may be configured to retransmit the uplink data according to a third resource scheduled using a second PDCCH format in response to the second PDCCH format being detected on the PDCCH.

In a possible implementation mode, the processing module may be configured to determine a sequence position of the feedback information in a feedback information sequence group in the first PDCCH format.

In a possible implementation mode, the receiving module may be configured to receive a second PDCCH format sent by the base station and a sequence position configured in the second PDCCH format, the second PDCCH format being PDCCH format 0_0 or PDCCH format 0_1; or, the receiving module may be configured to receive RRC signaling sent by the base station, the RRC signaling being used for semi-statically configuring the sequence position.

According to another aspect of the disclosure, a terminal is provided, which includes: a processor; a transceiver connected to the processor; and a memory configured to store instructions executable by the processor. The processor is configured to load and execute the executable instructions to implement the uplink transmission feedback method.

According to another aspect of the disclosure, an access network device is provided, which includes: a processor; a transceiver connected to the processor; and a memory configured to store instructions executable by the processor. The processor is configured to load and execute the executable instructions to implement the uplink transmission retransmission method.

According to another aspect of the disclosure, a computer-readable storage medium is provided. The computer-readable storage medium stores at least one instruction, at least one program, a code set or an instruction set, which are loaded and executed by a processor to implement the uplink transmission feedback method or the uplink transmission retransmission method.

The technical solutions provided in the embodiments of the disclosure at least include the following beneficial effects.

By sending the feedback information (ACK or NACK) of the uplink data to the terminal using the first PDCCH format on the second resource of the PDCCH, the terminal can obtain the feedback information of the uplink data in the shortest possible time, and retransmit the uplink data when the feedback information is the NACK, thereby ensuring the timeliness of the retransmission process and thus meeting a latency requirement of an eURLLC service.

BRIEF DESCRIPTION OF THE DRAWINGS

In order to more clearly illustrate technical solutions in embodiments of the disclosure, the accompanying drawings needed in the description of the embodiments are simply introduced below. It is apparent that the accompanying drawings in the following description are only some embodiments of the disclosure, for the ordinary skill in the art, some other accompanying drawings can also be obtained according to these on the premise of not contributing creative effort.

DETAILED DESCRIPTION

In order to make the purpose, technical solutions and advantages of the disclosure clearer, implementation modes of the disclosure will further be described below in combination with the drawings in detail.

A communication system and service scenarios described in the embodiments of the disclosure are intended to more clearly describe the technical solutions of the embodiments of the disclosure, and do not form a limit to the technical solutions provided in the embodiments of the disclosure. Those of ordinary skill in the art know that, with the evolution of communication system and the emergence of new service scenarios, the technical solutions provided in the embodiments of the disclosure are also applicable to similar technical problems.

Figure 1:
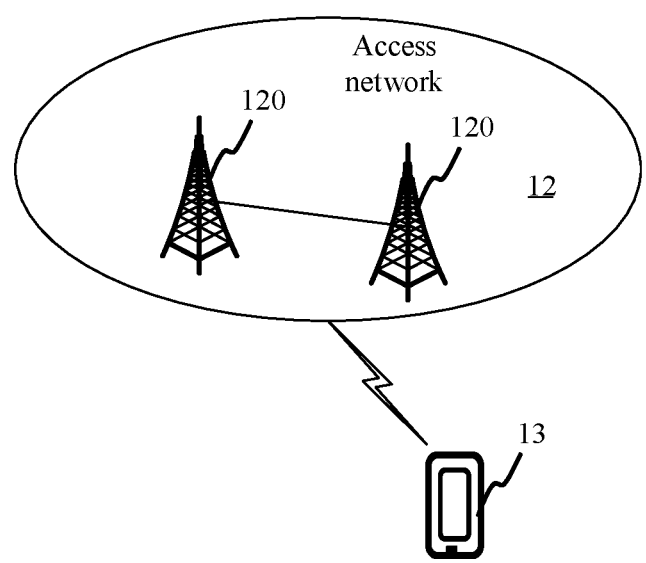
FIG. 1 is a schematic diagram illustrating a communication system provided by an exemplary embodiment of the disclosure.

FIG. 1 is a system structure diagram of a communication system according an exemplary embodiment of the disclosure. As illustrated in FIG. 1, the communication system may include: an access network 12 and a terminal 13.

The access network 12 includes several access network devices 120. The access network device 120 and a core network device communicate with each other through a certain interface technology, such as an S1 interface in the Long-Term Evolution (LTE) system and an NG interface in a New Radio (NR) system. The access network device 120 may be a base station, and the base station is an apparatus deployed in the access network to provide a wireless communication function for the terminal. The base station may include various forms of macro station, micro base station, relay station, access point, etc. In systems adopting different wireless access technologies, the device that functions as a base station may have different names. For example, in the LTE system, it is called eNodeB or eNB. In the 5G NR system, it is called gNodeB or gNB. As the communication technology evolves, the description of the term "base station" may change. Although the "base station" is used as an example in the embodiments of the disclosure, the base station may be understood as the access network device for providing user access function in each communication system.

The terminal 13 may include various handheld devices, vehicle-mounted devices, wearable devices, computing devices or other processing devices which may be connected/coupled to a wireless modem and may have the wireless communication function, as well as various forms of User Equipment (UE), Mobile Station (MS), terminal device and etc. For the convenience of description, the devices mentioned above are collectively referred to as the terminal. The access network device 120 and the terminal 13 communicate with each other through a certain interface technology, such as a Uu interface.

Optionally, the communication system has a high requirement on transmission latency. For example, an uplink communication system supports an eURLLC service. In some embodiments, the eURLLC service requires an end-to-end latency to reach 0.5 ms.

A PDCCH bears Downlink Control Information (DCI) sent by the base station to the UE. At present, the DCI has eight DCI formats: DCI format 0_0, DCI format 0_1, DCI format 1_0, DCI format 1_1, DCI format 2_0, DCI format 2_1, DCI format 2_2, and DCI format 2_3.

The functions of the DCI born by the PDCCH include: scheduling a PUSCH, scheduling a PDSCH, indicating a Slot Format Indicator (SFI), indicating a Pre-emption Indicator (PI), and power control command. The specific DCI format and the included information are as follows.

Before the downlink control channel is introduced in detail, it is needed to define some basic concepts of downlink channel, specifically including a Control Channel Element (CCE)/search space/Resource-Element Group (REG)/REG bundle and Control-Resource Set (CORESET), etc. The CCE is a basic unit that forms the PDCCH, occupying 6 REGs on frequency domain resources. A given PDCCH may include 1, 2, 4, 8, and 16 CCEs, and its specific value is determined by a DCI payload size and a required code rate. The number of CCEs that form the PDCCH is called an aggregation level. The base station may adjust the aggregation level of the PDCCH according to a wireless channel state actually transmitted so as to realize link adaptation transmission.

The aggregation level of the PDCCH actually sent by the base station is variable over time, and since there is no relevant signaling to inform the UE, the UE needs to blind detect the PDCCH at different aggregation levels. The PDCCH to be blind detected is called a candidate PDCCH. The UE will decode all candidate PDCCHs in the search space. If CRC passes, the content of the decoded PDCCH is considered to be valid for the UE, and information (such as scheduling indication, time slot format indication/power control command and the like) obtained by decoding is used for subsequent operations. In order to reduce the complexity of blind detection of the UE, it is needed to limit the set of CCE blind detected. The initial CCE sequence number of the candidate PDCCH needs to be able to be divisible by the number of CCEs of the candidate PDCCH.

The UE detects the PDCCH at limited CCE positions, thereby avoiding the increased complexity of blind detection, but this is not enough. In order to better control the complexity of blind detection in the NR, a control information format/aggregation level, the number of candidate control channels corresponding to the aggregation level, and a detection period of the search space in a time domain may be configured through high-level parameters. Based on the configuration information, the complexity of blind detection may be flexibly controlled. In short, not every DCI format needs to be blind detected in a candidate CCE set.

Figure 2:
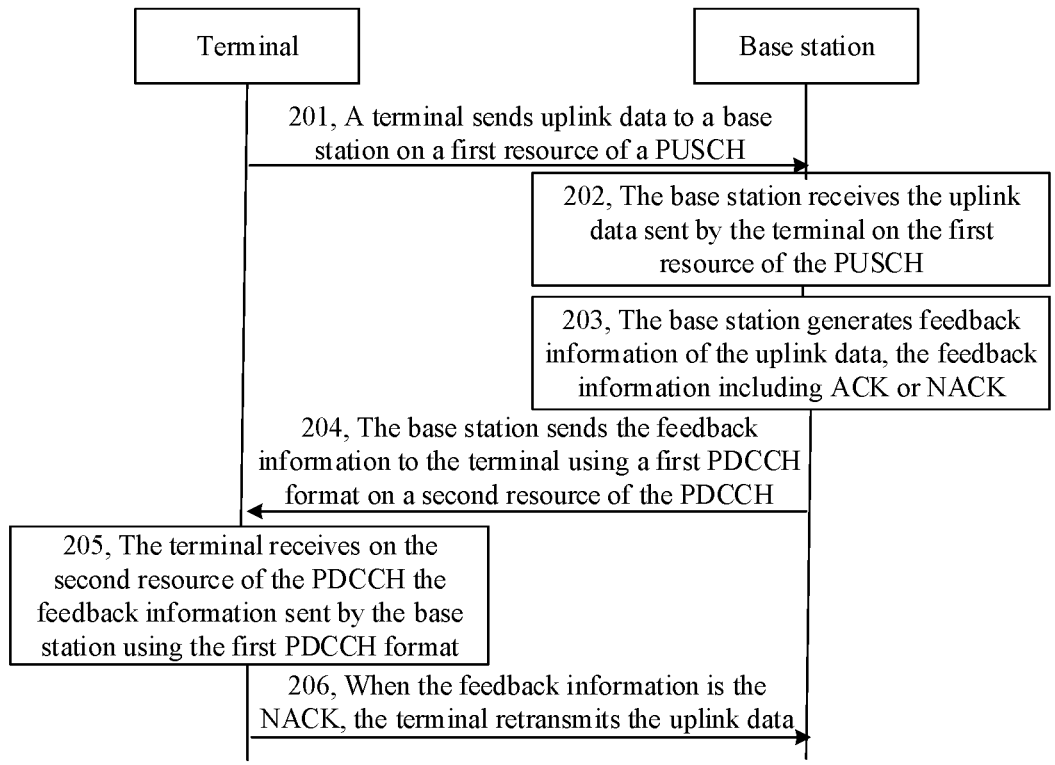
FIG. 2 is a flow chart showing an uplink transmission retransmission method according to an exemplary embodiment of the disclosure.

FIG. 2 is a flow chart showing an uplink transmission retransmission method according to an exemplary embodiment of the disclosure. The method may be performed by the communication system illustrated in FIG. 1. The method includes as follows.

At Step 201, a terminal sends uplink data to a base station on a first resource of a PUSCH.

At Step 202, the base station receives the uplink data sent by the terminal on the first resource of the PUSCH.

At Step 203, the base station generates feedback information of the uplink data, the feedback information including ACK or NACK.

When the uplink data is received successfully, the base station generates the ACK. When it is failed to receive the uplink data, or the uplink data is received but CRC of the uplink data fails, the base station generates the NACK.

At Step 204, the base station sends the feedback information to the terminal using a first PDCCH format on a second resource of the PDCCH.

Optionally, the first PDCCH format is a PDCCH format designed for feeding back the ACK/NACK. An interval between the second resource and the first resource in a time domain dimension is less than a threshold value. Schematically, the threshold value is 3 symbols.

Optionally, the operation that "the feedback information is sent to the terminal using the first PDCCH format" may include: DCI including the feedback information is sent to the terminal, the DCI adopting the first PDCCH format.

At Step 205, the terminal receives, on the second resource of the PDCCH, the feedback information sent by the base station using the first PDCCH format.

At Step 206, when the feedback information is the NACK, the terminal retransmits the uplink data.

To sum up, in the method provided by the embodiment, by sending the feedback information (ACK or NACK) of the uplink data to the terminal using the first PDCCH format on the second resource of the PDCCH, the terminal can obtain the feedback information of the uplink data in the shortest possible time, and retransmit the uplink data when the feedback information is the NACK, thereby ensuring the timeliness of the retransmission process and thus meeting a latency requirement of an eURLLC service.

Step 201, Step 205 and Step 206 may be implemented separately as an uplink transmission retransmission method on the terminal side, and Step 202, Step 203 and Step 204 may be implemented separately as an uplink transmission feedback method on the base station side.

In an optional embodiment based on FIG. 2, for Step 204 and Step 205, the first PDCCH format is a PDCCH format designed for feeding back the ACK/NACK.

Optionally, the first PDCCH format occupies X symbols on the PDCCH, where X is any value or a specified value in 1, 2 and 3. Any value means that the base station adopts any symbol of 1, 2, and 3 when transmitting the first PDCCH format. The specified value means limiting X to a constant fixed value, thereby reducing the complexity of blind detection to save the processing time of the terminal during the blind detection.

Optionally, the first PDCCH format is PDCCH format 2_4.

Figure 3:
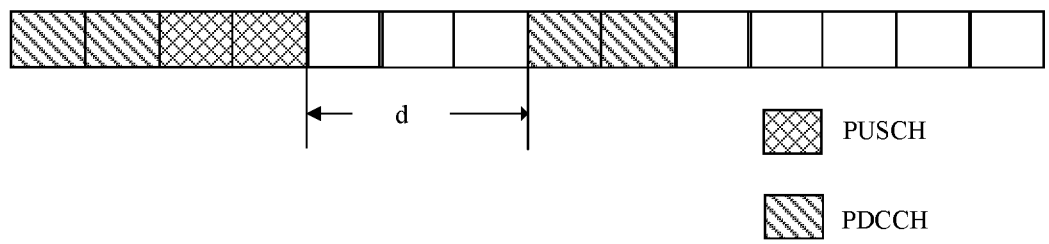
FIG. 3 is a schematic diagram illustrating a first resource and a second resource according to an exemplary embodiment of the disclosure.

In an optional embodiment based on FIG. 2, referring to FIG. 3, the number of symbols d between the first symbol of the second resource on the PDCCH and the last symbol of the first resource on the PUSCH is not greater than K, where K is any value or a specified value in 0, 1, 2 and 3.

In an optional embodiment based on FIG. 2, for Step 204 and Step 205, the CRC of the first PDCCH format is scrambled using an ACK-RNTI corresponding to the terminal. The ACK-RNTI may be the RNTI used only by the terminal, or it may be the identifier shared by the terminal and other terminals. When the ACK-RNTI is the identifier shared by n terminals, the first PDCCH format includes the ACK/NACK of the n terminals. That is, the first PDCCH format includes a feedback information sequence group, the feedback information sequence group includes n bits, and each bit corresponds to the ACK/NACK of a terminal, referring to the following embodiments.

Figure 4:
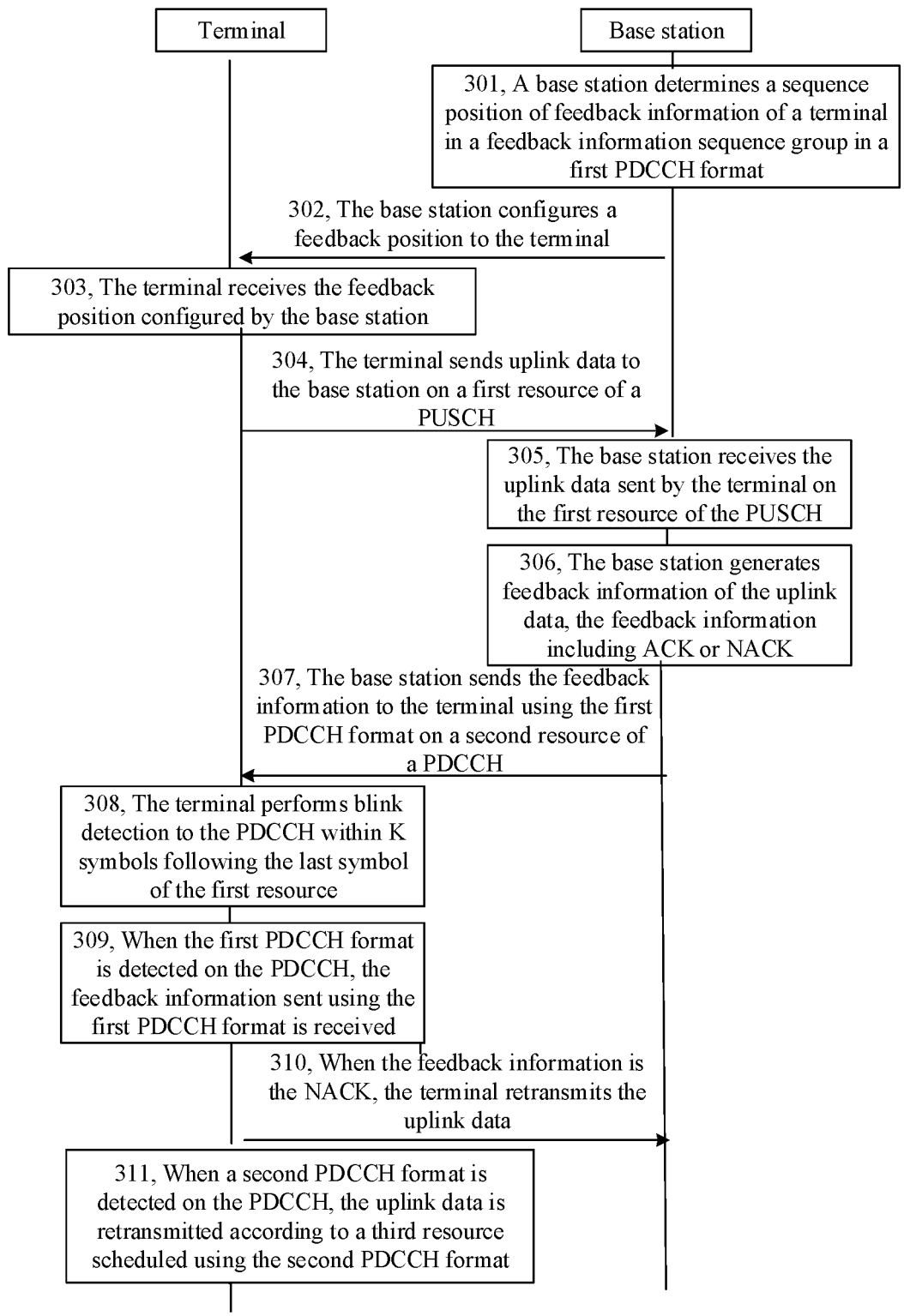
FIG. 4 is a flow chart showing an uplink transmission retransmission method according to an exemplary embodiment of the disclosure.

FIG. 4 is a flow chart showing an uplink transmission retransmission method according to an exemplary embodiment of the disclosure. The method may be performed by the communication system illustrated in FIG. 1. The method includes as follows.

At Step 301, a base station determines a sequence position of feedback information of a terminal in a feedback information sequence group in a first PDCCH format.

The first PDCCH format is a PDCCH format provided by embodiments of the disclosure to feed back ACK or NACK. The PDCCH format may be PDCCH format 2_4.

When multiple terminals share the same ACK-RNTI, the base station needs to determine the sequence position of the feedback information of the present terminal in the feedback information sequence group.

Figure 5:
FIG. 5 is a structural block diagram of a feedback information sequence group according to an exemplary embodiment of the disclosure.

Schematically, referring to FIG. 5, it is set that the feedback information sequence group includes the feedback information of 9 terminals, that is, the feedback information sequence group includes 9 bits, and each bit corresponds to a piece of UE. If the present terminal is UE2, the sequence position of the UE2 is the second position in the feedback information sequence group.

At Step 302, the base station configures a feedback position to the terminal.

The base station configures the feedback position to the terminal in, but not limited to, the following two manners.

In the first manner, the base station configures the sequence position to the terminal using a second PDCCH format on a PDCCH. The second PDCCH format is a PDCCH format used for configuring a first resource to the terminal. The second PDCCH format may be PDCCH format 0_0 or PDCCH format 0_1.

In the second manner, the base station semi-statically configures the sequence position to the terminal using RRC signaling.

At Step 303, the terminal receives the feedback position configured by the base station.

Corresponding to the above step, the terminal receives the feedback position configured by the base station in, but not limited to, the following two manners.

In the first manner, the terminal receives the sequence position configured by the base station using the second PDCCH format on the PDCCH. At the same time, the terminal acquires scheduling information of the first resource from the second PDCCH format. The second PDCCH format may be understood as DCI using the second PDCCH format.

In the second manner, the terminal receives the sequence position semi-statically configured by the base station using the RRC signaling.

It is to be noted that Steps 301 to Step 303 are optional when multiple pieces of UE share the same ACK-RNTI.

At Step 304, the terminal sends uplink data to the base station on a first resource of a PUSCH.

At Step 305, the base station receives the uplink data sent by the terminal on the first resource of the PUSCH.

At Step 306, the base station generates feedback information of the uplink data, the feedback information including ACK or NACK.

At Step 307, the base station sends the feedback information to the terminal using the first PDCCH format on a second resource of a PDCCH.

Optionally, the first PDCCH format is a PDCCH format designed for feeding back the ACK/NACK.

Optionally, the first PDCCH format occupies X symbols on the PDCCH, where X is any value or a specified value in 1, 2 and 3. Any value means that the base station adopts any symbol of 1, 2, and 3 when transmitting the first PDCCH format. The specified value means limiting X to a constant fixed value, thereby reducing the complexity of blind detection to save the processing time of the terminal during the blind detection. The number of symbols d between the first symbol of the second resource on the PDCCH and the last symbol of the first resource on the PUSCH is not greater than K, where K is any value or a specified value in 0, 1, 2 and 3.

Optionally, the first PDCCH format is PDCCH format 2_4.

In some embodiments, the base station may also send the DCI in the second PDCCH format on the second resource to directly schedule the terminal for retransmission.

At Step 308, the terminal performs blink detection to the PDCCH within K symbols following the last symbol of the first resource.

At Step 309, when the first PDCCH format is detected on the PDCCH, the feedback information sent using the first PDCCH format is received.

When a blind detection result is that the first PDCCH format is detected, the feedback information sent using the first PDCCH format is received. After receiving the feedback information, the terminal performs CRC to the first PDCCH format using its own ACK-RNTI, and after the CRC is successful, the terminal determines that it has received the feedback information from the base station.

Optionally, when the ACK-RNTI is the identifier shared by the terminal and other terminals, the terminal also determines the sequence position of its own feedback information in the feedback information sequence group, so as to extract its own feedback information from the feedback information sequence group.

At Step 310, when the feedback information is the NACK, the terminal retransmits the uplink data.

Optionally, the terminal retransmits the uplink data on a specified resource. For example, the terminal retransmits the uplink data on a resource used for unauthorized transmission.

Correspondingly, the base station receives the uplink data retransmitted by the terminal.

At Step 311, when a second PDCCH format is detected on the PDCCH, the uplink data is retransmitted according to a third resource scheduled using the second PDCCH format.

When the blink detection result is that the second PDCCH format is detected, the terminal may retransmit the uplink data according to the third resource scheduled using the second PDCCH format.

To sum up, in the method provided by the embodiment, by sending the feedback information (ACK or NACK) of the uplink data to the terminal using the first PDCCH format on the second resource of the PDCCH, the terminal can obtain the feedback information of the uplink data in the shortest possible time, and retransmit the uplink data when the feedback information is the NACK, thereby ensuring the timeliness of the retransmission process and thus meeting a latency requirement of an eURLLC service.

In the method provided by the embodiment, by including the feedback information sequence group in the first PDCCH format, the base station can simultaneously send the feedback information to multiple terminals, which is applicable to industrialization scenarios in the eURLLC, and can simultaneously feedback multiple industrialization terminals in the eURLLC.

The method provided by the embodiment may also combine ACK/NACK feedback and PDCCH scheduling retransmission, so as to obtain better compatibility with the communication systems in the related art.

It is to be noted that the steps performed by the terminal in the above embodiment may be implemented separately as an uplink transmission retransmission method on the terminal side, and the steps performed by the base station may be implemented separately as an uplink transmission feedback method on the base station side.

It is to be further noted that the above embodiments may also be freely split and/or combined into new embodiments by those skilled in the art, which is not limited.

The following are apparatus embodiments of the disclosure. For details not described in detail in the apparatus embodiments, refer to the above method embodiments in one-to-one correspondence.

Figure 6:
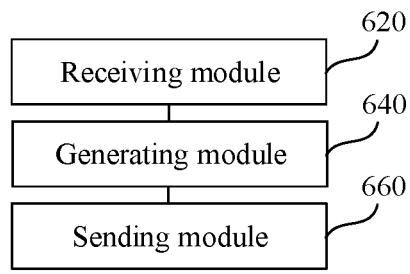
FIG. 6 is a block diagram of an uplink transmission retransmission apparatus according to another exemplary embodiment of the disclosure.

FIG. 6 shows a block diagram of an uplink transmission feedback apparatus according to an exemplary embodiment of the disclosure. The apparatus may become part or all of the base station (or the access network device) through software, hardware, or a combination of the two. The apparatus includes: a receiving module 620, a generating module 640 and a sending module 660. The receiving module 620 and the sending module 660 may be hardware apparatus such as a radio frequency antenna and the like, and the generating module 640 may be hardware devices such as a central processor, a baseband processor or the like.

The receiving module 620 is configured to receive uplink data sent by a terminal on a first resource of a PUSCH.

The generating module 640 is configured to generate feedback information of the uplink data, the feedback information including Acknowledgement feedback (ACK) or Negative Acknowledgement feedback (NACK).

The sending module 660 is configured to send the feedback information to the terminal using a first PDCCH format on a second resource of a PDCCH.

In an optional embodiment, the first PDCCH format occupies X symbols on the PDCCH, where X is any value or a specified value in 1, 2 and 3.

In an optional embodiment, the number of symbols between the first symbol of the second resource and the last symbol of the first resource is not greater than K, where K is any value or a specified value in 0, 1, 2 and 3.

In an optional embodiment, the first PDCCH format is PDCCH format 2_4.

In an optional embodiment, CRC of the first PDCCH format is scrambled using an ACK-RNTI corresponding to the terminal.

The ACK-RNTI is an identifier shared by the terminal and other terminals.

In an optional embodiment, the sending module 660 is further configured to configure the ACK-RNTI to the terminal.

In an optional embodiment, the apparatus further includes a determining module 680.

The determining module 680 is configured to determine a sequence position of the feedback information in a feedback information sequence group in the first PDCCH format.

In an optional embodiment, the sending module 660 is further configured to configure the sequence position to the terminal using a second PDCCH format on the PDCCH, the second PDCCH format being PDCCH format 0_0 or PDCCH format 0_1, or semi-statically configure the sequence position to the terminal using RRC signaling.

Figure 7:
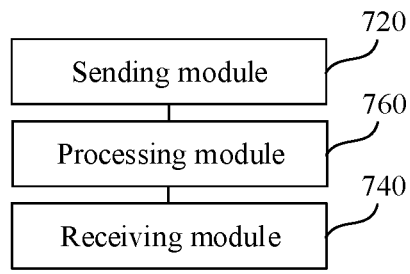
FIG. 7 is a block diagram of an uplink transmission retransmission apparatus according to another exemplary embodiment of the disclosure.

FIG. 7 shows a block diagram of an uplink transmission retransmission apparatus according to an exemplary embodiment of the disclosure. The apparatus may become part or all of the terminals through software, hardware, or a combination of the two. The apparatus includes: a sending module 720, a receiving module 740 and a processing module 760. The receiving module 740 and the sending module 720 may be hardware apparatus such as a radio frequency antenna and the like, and the processing module 760 may be hardware devices such as a central processor, a baseband processor or the like.

The sending module 720 is configured to send uplink data to a base station on a first resource of a PUSCH.

The receiving module 740 is configured to receive feedback information sent by the base station using a first PDCCH format on a second resource of a PDCCH, the feedback information including Acknowledgement feedback (ACK) or Negative Acknowledgement feedback (NACK).

The processing module 760 is configured to retransmit the uplink data when the feedback information is the NACK.

In an optional embodiment, the first PDCCH format occupies X symbols on the PDCCH, where X is any value or a specified value in 1, 2 and 3.

In an optional embodiment, the processing module 760 is configured to perform blink detection to the PDCCH within K symbols following the last symbol of the first resource.

The receiving module 740 is configured to receive the feedback information sent using the first PDCCH format when the first PDCCH format is detected on the PDCCH.

In an optional embodiment, the processing module 760 is configured to perform CRC to the first PDCCH format using an ACK-RNTI.

The ACK-RNTI is an identifier shared by a present terminal and other terminals.

In an optional embodiment, the receiving module 740 is configured to receive the ACK-RNTI configured by the base station.

In an optional embodiment, the processing module 760 is configured to retransmit the uplink data according to a third resource scheduled using a second PDCCH format when the second PDCCH format is detected on the PDCCH.

In an optional embodiment, the processing module 760 is configured to determine a sequence position of the feedback information in a feedback information sequence group in the first PDCCH format.

In an optional embodiment, the receiving module 740 is configured to receive a second PDCCH format sent by the base station and the sequence position configured in the second PDCCH format, the second PDCCH format being PDCCH format 0_0 or PDCCH format 0_1. Or, the receiving module 740 is configured to receive RRC signaling sent by the base station, the RRC signaling being used for semi-statically configuring the sequence position.

Figure 8:
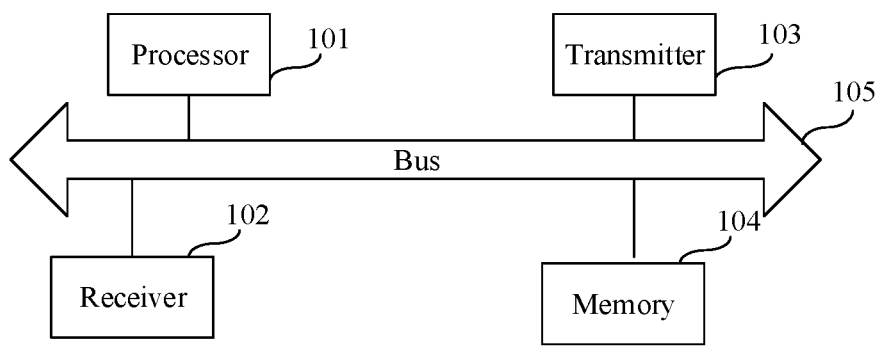
FIG. 8 is a block diagram of a terminal according to an exemplary embodiment of the disclosure.

FIG. 8 shows a structural schematic diagram of a terminal provided by an exemplary embodiment of the disclosure. The terminal includes: a processor 101, a receiver 102, a transmitter 103, a memory 104 and a bus 105.

The processor 101 includes one or more processing cores. The processor 101 runs a software program and module to perform various function applications and information processing.

The receiver 102 and the transmitter 103 may be implemented as a communication component, which may be a communication chip.

The memory 104 is connected with the processor 101 through the bus 105.

The memory 104 may be used for storing at least one instruction, and the processor 101 is used for executing the at least one instruction to implement the steps in the above method embodiments.

In addition, the memory 104 may be implemented by any type of volatile or non-volatile memory devices. The volatile or non-volatile memory devices include but are not limited to: a magnetic or optical disk, an Electrically Erasable Programmable Read-Only Memory (EEPROM), an Erasable Programmable Read-Only Memory (EPROM), a Static Random Access Memory (SRAM), a Read-Only Memory (ROM), a magnetic memory, a flash memory, and a Programmable Read-Only Memory (PROM).

In an exemplary embodiment, a computer-readable storage medium is also provided. The computer-readable storage medium stores at least one instruction, at least one program, a code set or an instruction set, which are loaded and executed by the processor to implement the uplink transmission retransmission method provided in the method embodiments.

Figure 9:
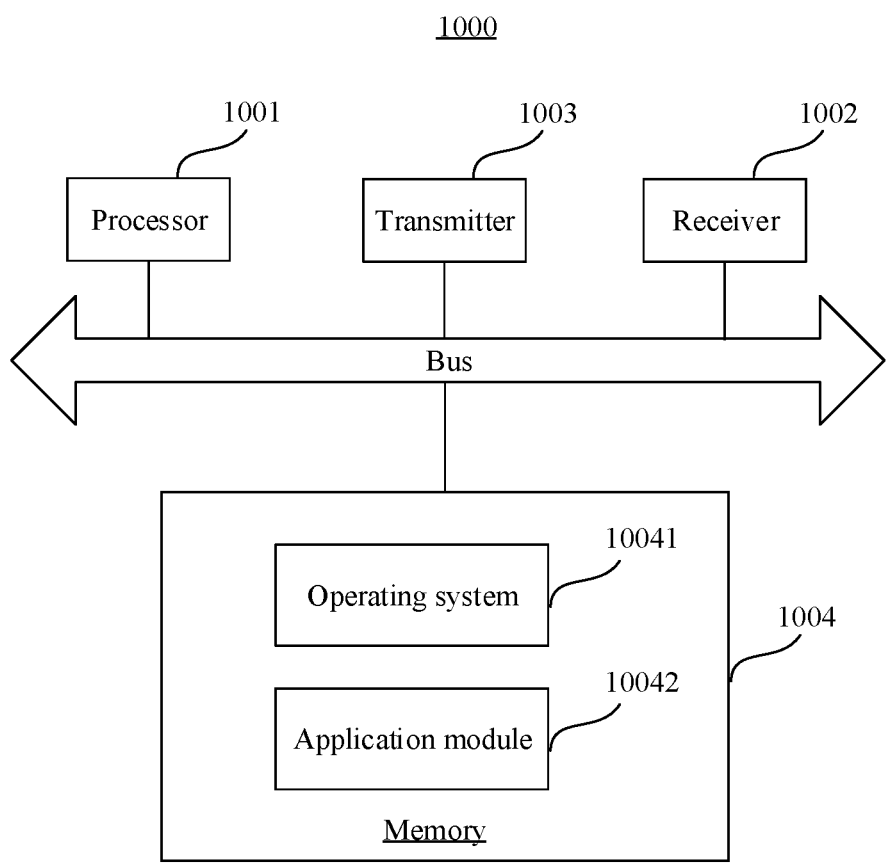
FIG. 9 is a block diagram of an access network device (base station) according to an exemplary embodiment of the disclosure.

FIG. 9 is a block diagram of an access network device 1000 according to an exemplary embodiment.

The access network device 1000 may include a processor 1001, a receiver 1002, a transmitter 1003 and a memory 1004. The receiver 1002, the transmitter 1003 and the memory 1004 are connected with the processor 1001 through a bus respectively.

The processor 1001 includes one or more than one processing core, and the processor 1001 runs a software program and a module to execute the method executed by the access network device in the transmission configuration methods provided in the embodiments of the disclosure. The memory 1004 may be configured to store the software program and the module. Specifically, the memory 1004 may store an operating system 10041 and an application program module 10042 required by at least one function. The receiver 1002 is configured to receive communication data sent by another device, and the transmitter 1003 is configured to send communication data to the other device.

In an exemplary embodiment, a computer-readable storage medium is also provided. The computer-readable storage medium stores at least one instruction, at least one program, a code set or an instruction set, which are loaded and executed by the processor to implement the steps in the uplink transmission feedback method provided in the method embodiments.

Those of ordinary skill in the art may understand that all or part of the steps for implementing the above embodiments may be completed through hardware or by related hardware instructed by a program. The program may be stored in a computer-readable storage medium. The storage medium mentioned above may be an ROM, a magnetic or optical disk, etc.

The above is only the preferred embodiment of the present application and not intended to limit the present application. Any modifications, equivalent replacements, improvements and the like made within the spirit and principle of the present application shall fall within the scope of protection of the disclosure.

What is claimed is:
1. An uplink transmission feedback method, performed by a base station, comprising:
receiving uplink data sent by a terminal on a first resource of a Physical Uplink Shared Channel (PUSCH);

generating feedback information of the uplink data, the feedback information comprising Acknowledgement feedback (ACK) or Negative Acknowledgement feedback (NACK); and sending the feedback information to the terminal using a first Physical Downlink Control Channel (PDCCH) format on a second resource of a PDCCH;

wherein a number of symbols between a first symbol of the second resource and a last symbol of the first resource is not greater than K, where K is any value in 0, 1, 2, and 3, and a blind detection is performed to the PDCCH within K symbols following the last symbol of the first resource.

2. The method of claim 1, wherein the first PDCCH format occupies X symbols on the PDCCH, where X is any value or a specified value in 1, 2 and 3.

3. The method of claim 1, wherein the first PDCCH format is PDCCH format 2_4.

4. The method of claim 1, wherein Cyclic Redundancy Check (CRC) of the first PDCCH format is scrambled using an ACK Radio-Network Temporary Identifier (ACK-RNTI) corresponding to the terminal;

the ACK-RNTI is an identifier shared by the terminal and other terminals.

5. The method of claim 4, further comprising:
configuring the ACK-RNTI to the terminal.

6. The method of claim 4, further comprising:
determining a sequence position of the feedback information in a feedback information sequence group in the first PDCCH format.

7. The method of claim 6, before sending the feedback information to the terminal using the first PDCCH format on the second resource of the PDCCH, further comprising:
configuring the sequence position to the terminal using a second PDCCH format on the PDCCH, the second PDCCH format being PDCCH format 0_0 or PDCCH format 0_1;
or,
semi-statically configuring the sequence position to the terminal using Radio Resource Control (RRC) signaling.

8. An uplink transmission retransmission method, performed by a terminal, comprising:
sending uplink data to a base station on a first resource of a Physical Uplink Shared Channel (PUSCH);
receiving feedback information sent by the base station using a first Physical Downlink Control Channel (PDCCH) format on a second resource of a PDCCH, the feedback information comprising Acknowledgement feedback (ACK) or Negative Acknowledgement feedback (NACK); and
retransmitting the uplink data in response to the feedback information being the NACK;
wherein a number of symbols between a first symbol of the second resource and a last symbol of the first resource is not greater than K, and K is any value in 0, 1, 2, and 3;
wherein the receiving the feedback information sent by the base station using the first PDCCH format on the second resource of the PDCCH comprises:
performing a blind detection to the PDCCH within K symbols following the last symbol of the first resource; and
receiving the feedback information sent by using the first PDCCH format in response to the first PDCCH format being detected on the PDCCH.

9. The method of claim 8, wherein the first PDCCH format occupies X symbols on the PDCCH, where X is any value or a specified value in 1, 2 and 3.

10. The method of claim 8, wherein the receiving the feedback information sent by using the first PDCCH format comprises:
performing Cyclic Redundancy Check (CRC) to the first PDCCH format using an ACK Radio-Network Temporary Identifier (ACK-RNTI);
wherein the ACK-RNTI is an identifier shared by a present terminal and other terminals.

11. The method of claim 10, further comprising:
receiving the ACK-RNTI configured by the base station.

12. The method of claim 8, further comprising:
retransmitting the uplink data according to a third resource scheduled using a second PDCCH format in response to the second PDCCH format being detected on the PDCCH;
wherein the second PDCCH format is PDCCH format 0_0 or PDCCH format 0_1.

13. The method of claim 8, further comprising:
determining a sequence position of the feedback information in a feedback information sequence group in the first PDCCH format.

14. The method of claim 13, before sending the feedback information to the terminal using the first PDCCH format on the second resource of the PDCCH, further comprising:
receiving a second PDCCH format sent by the base station and the sequence position configured in the second PDCCH format, the second PDCCH format being PDCCH format 0_0 or PDCCH format 0_1;
or,
receiving Radio Resource Control (RRC) signaling sent by the base station, the RRC signaling being used for semi-statically configuring the sequence position.

15. A terminal, comprising:
a processor;
a transceiver connected to the processor;
a memory configured to store instructions executable by the processor;
wherein the processor is configured to:
receive uplink data sent by the terminal on a first resource of a Physical Uplink Shared Channel (PUSCH);
generate feedback information of the uplink data, the feedback information comprising Acknowledgement feedback (ACK) or Negative Acknowledgement feedback (NACK); and
send the feedback information to the terminal using a first Physical Downlink Control Channel (PDCCH) format on a second resource of a PDCCH;
wherein a number of symbols between a first symbol of the second resource and a last symbol of the first resource is not greater than K, where K is any value in 0, 1, 2, and 3, and a blind detection is performed to the PDCCH within K symbols following the last symbol of the first resource.

16. An access network device implementing the method of claim 8, comprising:
a processor;
a transceiver connected to the processor;
a memory configured to store instructions executable by the processor;
wherein the processor is configured to load and execute the executable instructions to implement the steps of the method.

17. A non-transitory computer-readable storage medium, storing at least one instruction, at least one program, a code set or an instruction set, which are loaded and executed by a processor to implement the method of claim 1.

18. A non-transitory computer-readable storage medium, storing at least one instruction, at least one program, a code set or an instruction set, which are loaded and executed by a processor to implement the method of claim 8.

* * * * *